March 29, 1960 W. MUENCH 2,930,132
MEANS FOR MOUNTING SINE-BARS FOR DRILLING, MILLING
AND GRINDING OPERATIONS
Filed Aug. 10, 1954 6 Sheets-Sheet 1
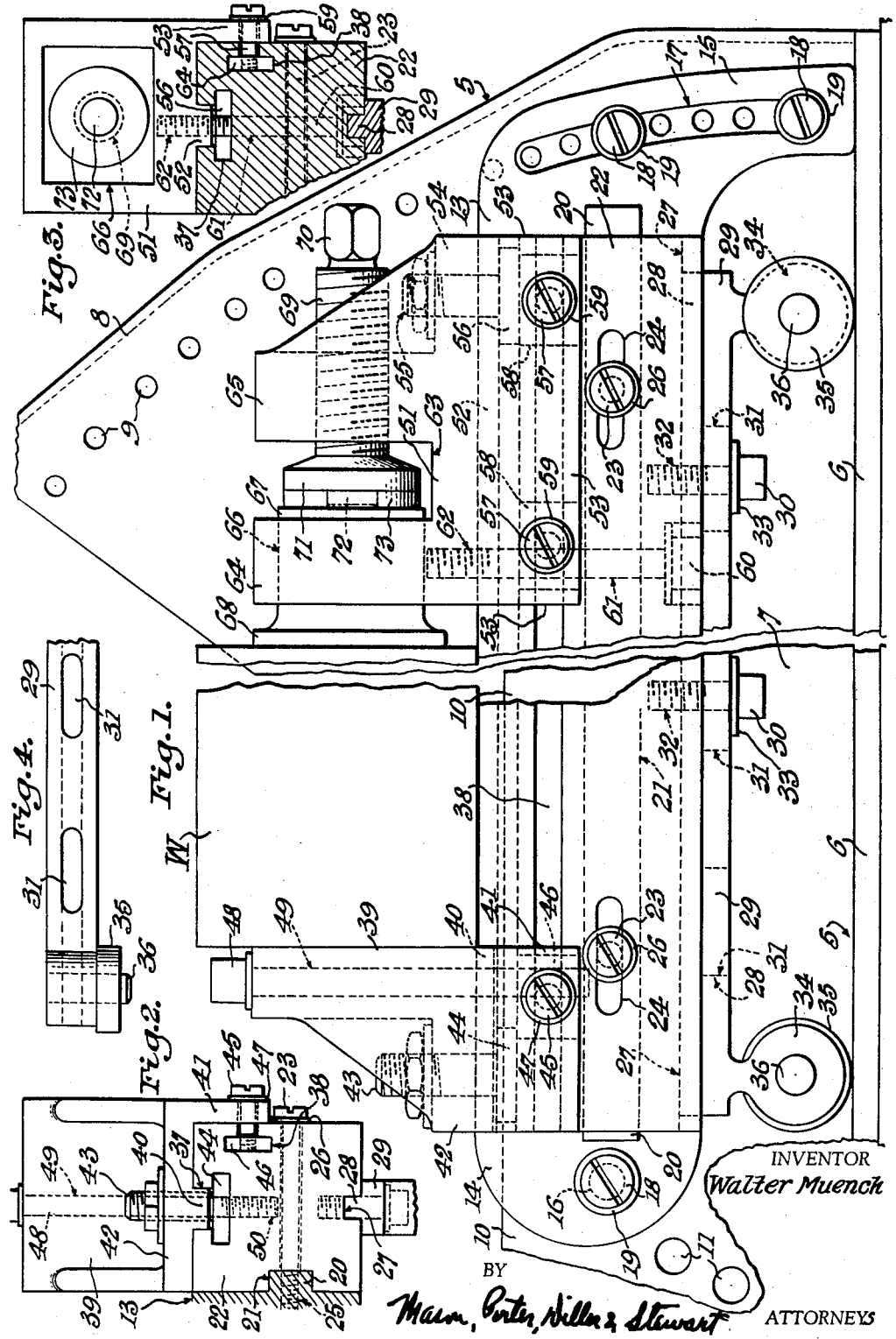
INVENTOR
Walter Muench
BY
Mason, Porter, Diller & Stewart
ATTORNEYS

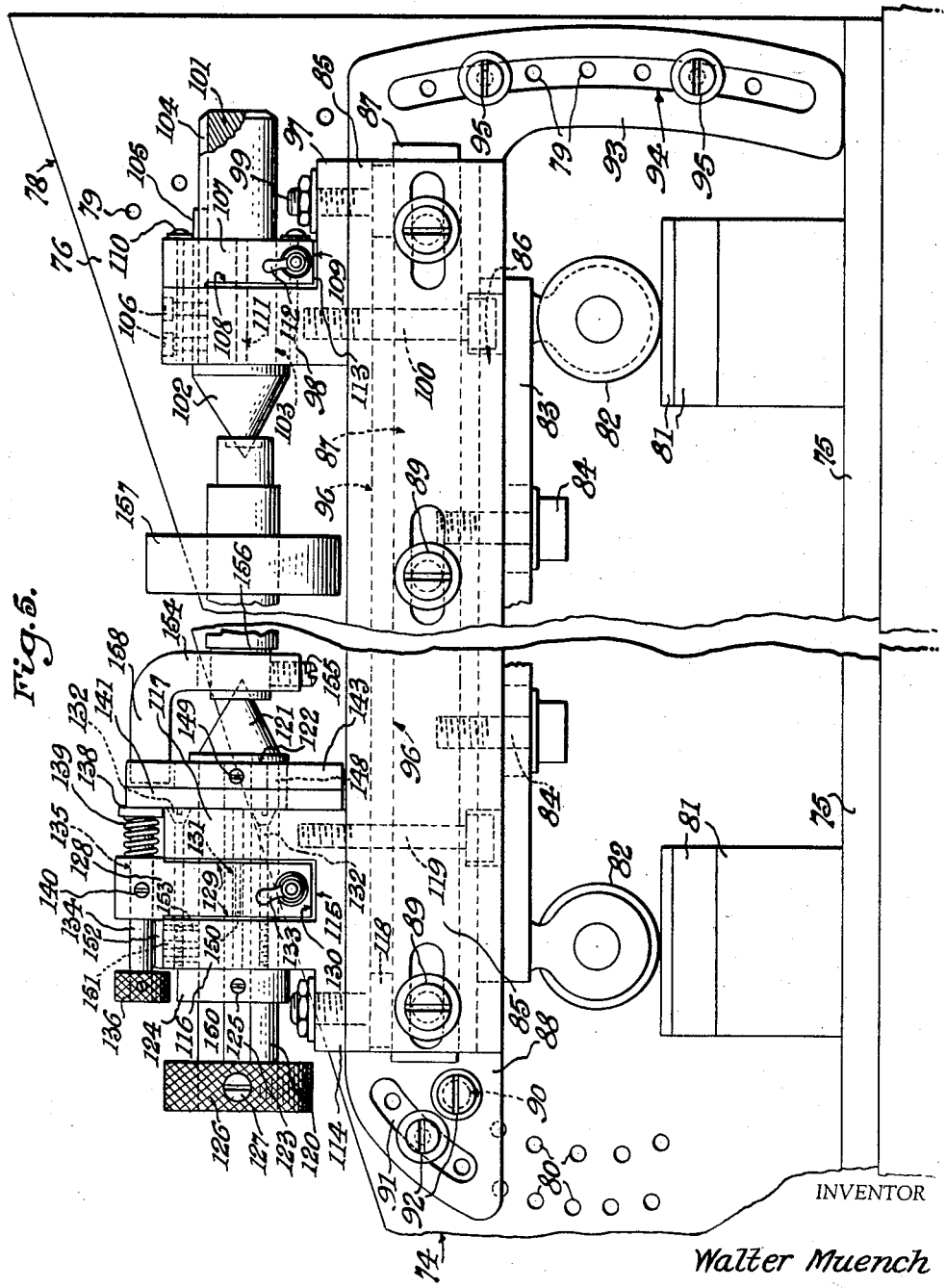

March 29, 1960  W. MUENCH  2,930,132
MEANS FOR MOUNTING SINE-BARS FOR DRILLING, MILLING
AND GRINDING OPERATIONS
Filed Aug. 10, 1954  6 Sheets-Sheet 3
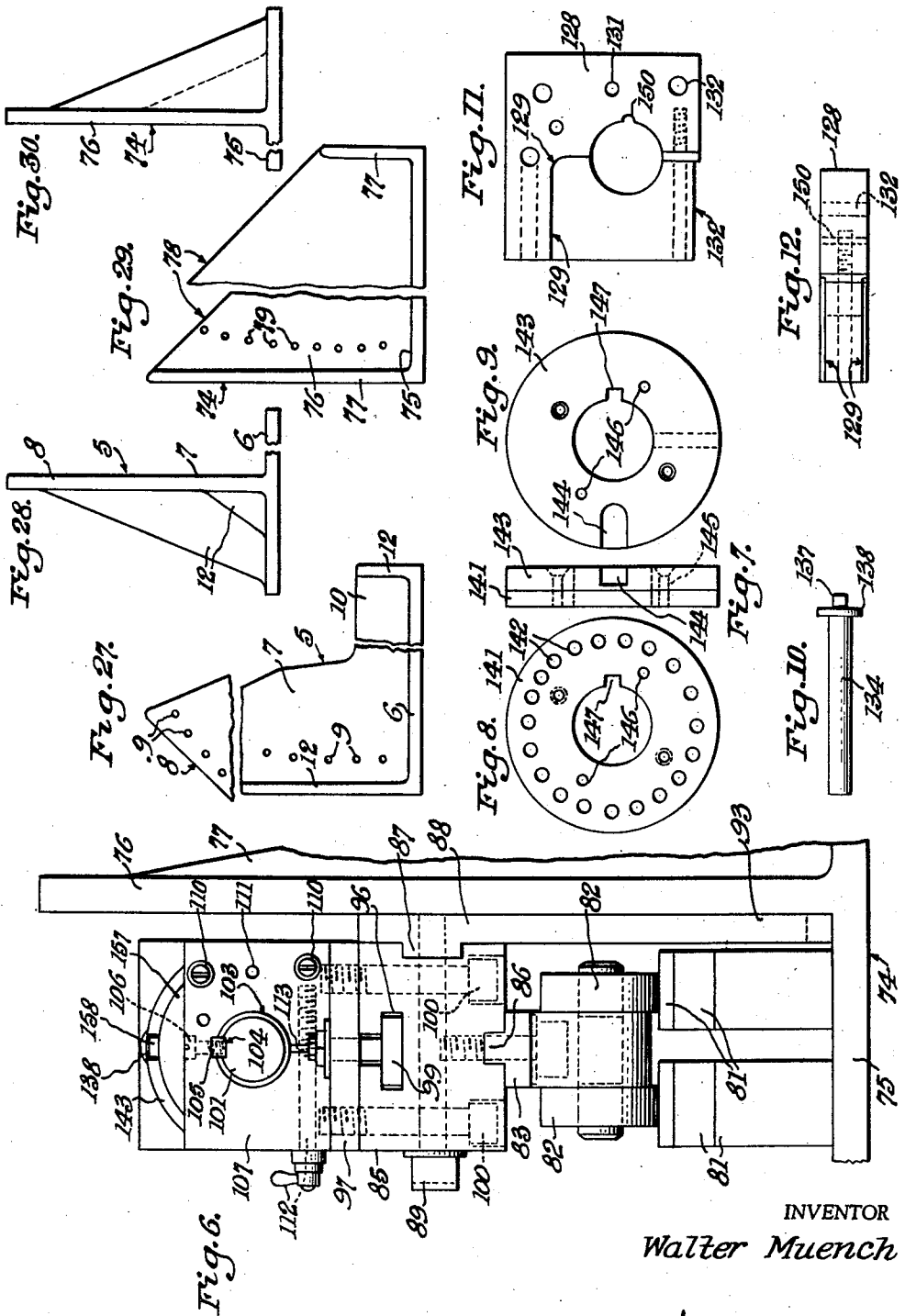
INVENTOR
Walter Muench
BY
ATTORNEYS

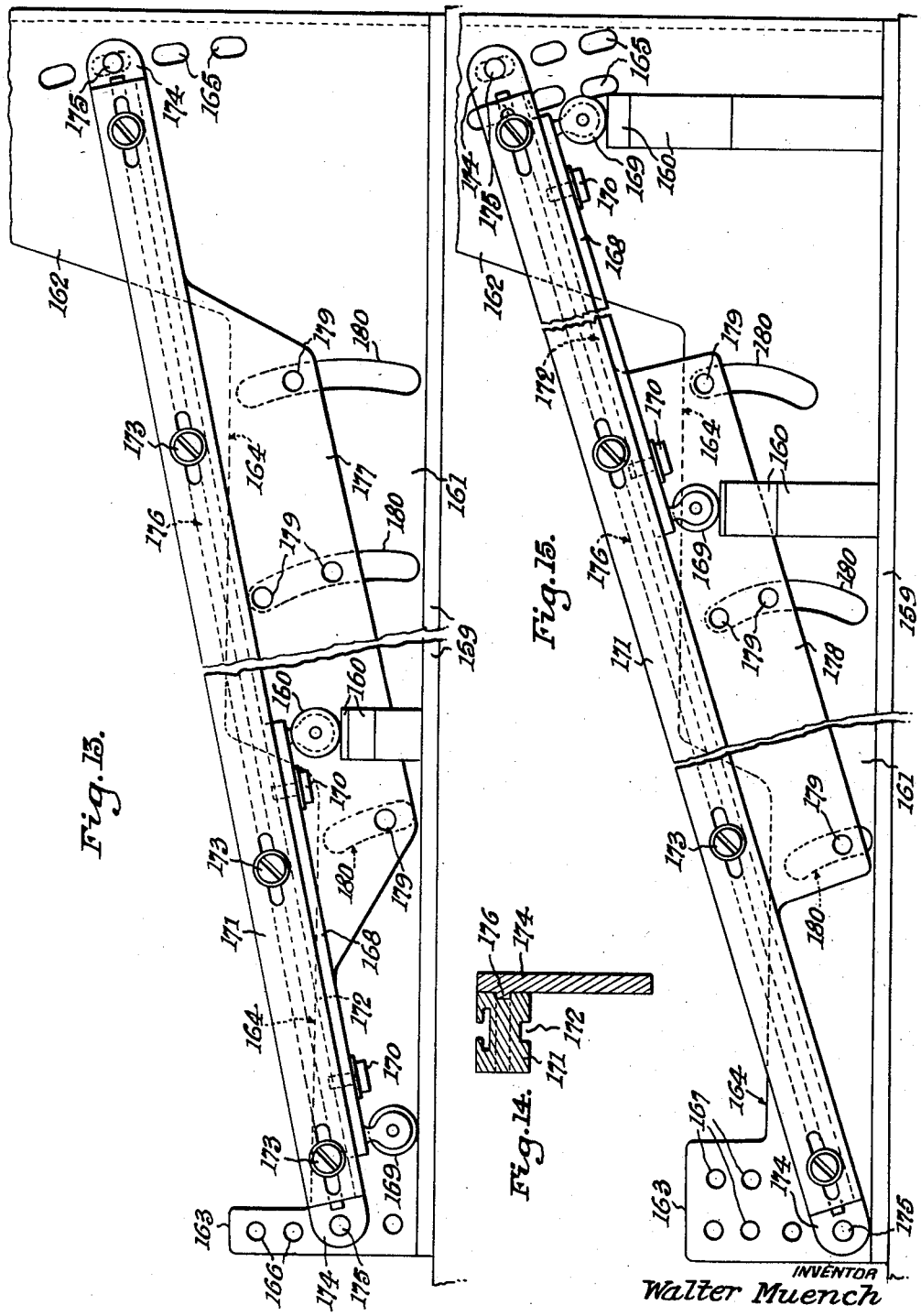

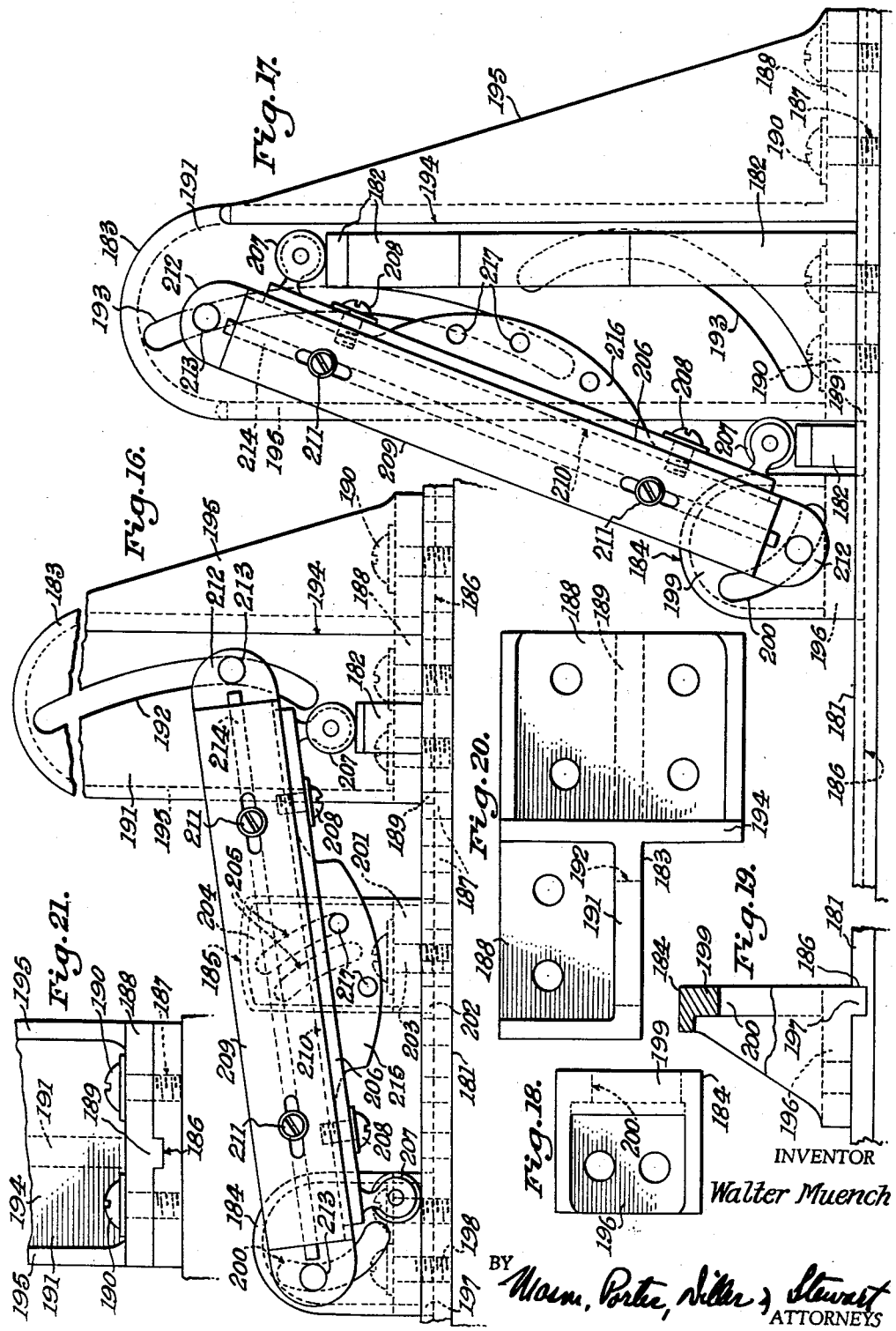

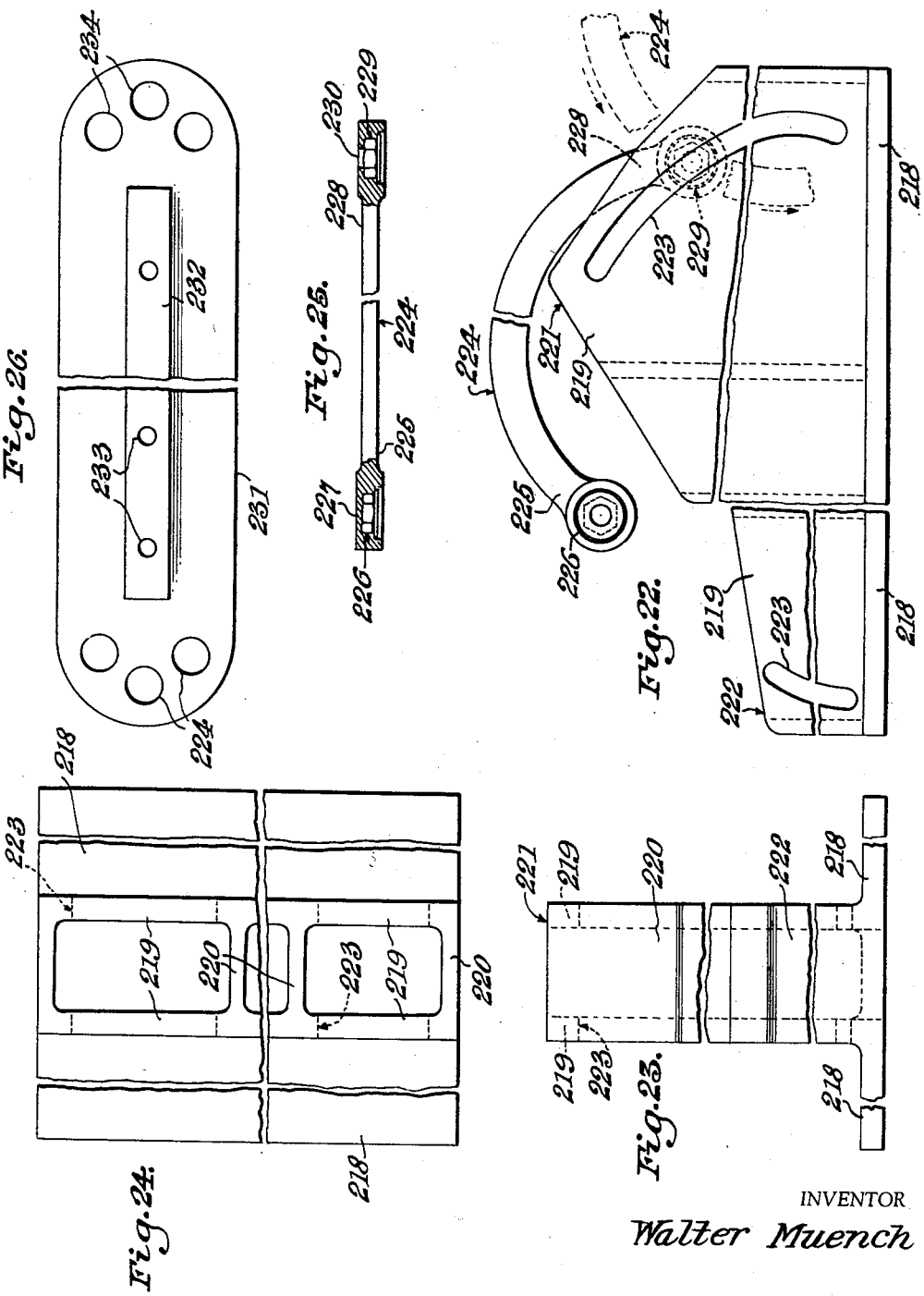

United States Patent Office 2,930,132
Patented Mar. 29, 1960

2,930,132

MEANS FOR MOUNTING SINE-BARS FOR DRILLING, MILLING, AND GRINDING OPERATIONS

Walter Muench, Newark, N.J., assignor to Walter Muench, Incorporated, Newark, N.J., a corporation of New Jersey Application August 10, 1954, Serial No. 448,912

15 Claims. (Cl. 33—174)

This invention relates generally to sine-bars and practical uses thereof and primarily seeks to provide novel sine-bar mounting means by employment of which sine-bars can be used in a much more practical manner than has been possible, heretofore.

In conventional practices heretofore, when a sine-bar had to be used in a machine shop or tool-room, the sine-bar was fastened to and held on an angle plate by use of C-clamps and parallel-clamps. It was also the practice to similarly clamp the work-piece itself to the angle plate. Consequently, there was always a collection of assorted sizes and shapes of clamps clustered about such a set-up, and it often was difficult to get to the work piece with a milling cutter or a grinding wheel. It is also well known that the use of clamps has been somewhat hazardous due to loosening of the clamps as a result of vibration, and injury to operators and damage to work often has resulted.

To overcome the above mentioned faults, and others encountered in presently known practices, is the purpose of the herein described invention.

An object of the invention is to provide a novel means for mounting sine-bars in which the necessity for using C-clamps and parallel clamps is entirely eliminated.

Another object of the invention is to provide an improved mounting of the character stated including an angle plate having an upright supporting wall and a base flange extending in right angular relation to the supporting wall and whereon gage blocks may be mounted, a disk rail having disks mounted on and depending from end portions thereof for supporting engagement on the base flange and/or gage blocks thereon, a sine-bar block secured on the disk rail, a support bracket secured to said block, and means for rigidly securing the bracket to the supporting wall for fixing the accurate placement of the sine-bar block determined by the disk and flange or disk and gage block engagement.

Another object of the invention is to provide an apparatus of the character stated wherein the base flange and the upright supporting wall or portions forming said wall are separable parts, and there are included means for adjustably securing the wall or portions on the base flange for selective positioning purposes.

Another object of the invention is to provide an apparatus of the character stated wherein the angle plate has two upright, parallel spaced and oppositely facing supporting walls both disposed within the width of the supporting base flange so that a sine-bar attached support bracket can be secured to either supporting wall with the supporting disk rail overlying the base flange, the space between the supporting walls permitting insertion of wrench means incidental to the securing of parts to the supporting walls.

Another object of the invention is to provide an apparatus of the character stated wherein means are provided for adjustably securing the disk rail to the sine-bar block so that the rail can be placed at selected positions along said block.

Another object of the invention is to provide an apparatus of the character stated wherein means are provided for adjustably securing the sine-bar block to the support bracket to permit selective positioning of the sine-bar block along the support bracket.

Another object of the invention is to provide an apparatus of the character stated wherein the means for securing the support bracket to the angle plate permits placement of the sine-bar block at selected angular relations to the base flange determined by gage block insertion between the flange and at least one disk plate disk.

A further object of the invention is to provide an apparatus of the character stated wherein are included novel means for holding a work piece on the sine-bar block.

A still further object of the invention is to provide an apparatus of the character stated wherein the means for holding the work piece on the sine-bar block includes devices for indexing the work piece about an axis and for securing the work piece in selected positions.

With the above and other objects in view that will hereinafter appear, the nature of the invention will be more clearly understood by reference to the following detailed description, the appended claims and the several views illustrated in the accompanying drawings.

In the drawings:

Figure 1 is a front elevation illustrating one adaptation of the invention, parts being broken away.

Figure 2 is a left end elevation of the sine-bar block and back-up jaw illustrated in Figure 1.

Figure 3 is a central vertical cross section taken through the sine-bar block of Figure 1 and looking toward the presser jaw thereon, the rectangular presser plunger being removed from the jaw socket.

Figure 4 is an inverted plan view of the left end portion of the disk rail shown in Figure 1.

Figure 5 is a front elevation illustrating another adaptation of the invention, parts being broken away.

Figure 6 is a right end elevation of the assembly shown in Figure 5.

Figure 7 is a detail edge view of the indexing plate and dog-plate assembly.

Figure 8 is a detail face view of the indexing plate.

Figure 9 is a detail face view of the dog-plate.

Figure 10 is a detail side elevation of the index locking plunger.

Figure 11 is a detail face view of the clamp block for gripping the rotatable cone shaft of Figure 5.

Figure 12 is a detail inverted plan view of the clamp block shown in Figure 11.

Figure 13 is a front elevation illustrating another adaptation of the invention, a modified form of angle plate and a support bracket including an intermediate depending apron being shown, and the disk rail being shown as secured adjacent the lower or left end of the sine-bar block.

Figure 14 is a central vertical cross section through the support bracket and sine-bar block of Figure 13.

Figure 15 is a view similar to Figure 13 showing another adaptation of the invention including another form of angle plate and intermediate apron equipped support bracket, the disk rail being shown as secured adjacent the upper or right end of the sine-bar block.

Figure 16 is a front elevation illustrating another adaptation of the invention wherein the angle plate upright wall is composed of separable and individual low angle, high angle and intermediate support wall portions, a low angle mounting of the support bracket, sine-bar block and disk rail being shown.

Figure 17 is a front elevation illustrating another adaptation of the invention similar to Figure 16 but using high angle mounting of the support bracket, sine-bar block and disk rail, the intermediate support wall portion being removed and a slightly modified form of high angle support wall portion being shown.

Figure 18 is a plan view and Figure 19 a part left edge view and vertical cross section of the low angle support wall portion of the angle plate.

Figure 20 is a plan view of the high angle support wall portion of the angle plate.

Figure 21 is a right end elevation of the lower portion of the high angle support wall portion shown in each of Figures 16 and 17.

Figure 22 is a front elevation illustrating another modified form of angle plate including parallel spaced and oppositely facing upright support wall portions parts being broken away, and a wrench being shown as inserted into the space between the upright support wall portions.

Figure 23 is a left end elevation of the angle plate shown in Figure 22, parts being broken away.

Figure 24 is a plan view of the angle plate of Figure 22, parts being broken away.

Figure 25 is an edge view of the wrench shown in Figure 22, the end portions of the wrench being shown in longitudinal section to illustrate the nut and washer receiving sockets therein.

Figure 26 is a face view illustrating a slightly modified form of support bracket, parts being broken away.

Figure 27 is a rear elevation on a reduced scale of the angle plate shown in Figure 1, parts being broken away.

Figure 28 is a right end elevation of the angle plate as viewed in Figure 27.

Figure 29 is a rear elevation on a reduced scale of the angle plate of Figure 5, parts being broken away.

Figure 30 is a left end elevation of the angle plate of Figure 5 as viewed in Figure 29.

In the example of embodiment of the invention shown in Figures 1 through 4, 27 and 28 the apparatus includes an angle plate generally designated 5 and having a horizontal base flange 6 and an upright support wall portion 7, said flange and wall portion bearing right angular relation and the flange being adapted to receive Johannsen gage blocks hereinafter termed Jo-blocks after the common practice in the art. The support wall 7 has a high peak portion 8 at its right hand end, and is equipped near said end with an arcuate arrangement of threaded, clamp screw receiving bores 9. The wall 7 has a low level left end extension 10 which is equipped near its left end extremity with an arcuate arrangement of threaded, clamp screw receiving bores 11. It will be apparent by reference to Figures 27 and 28 that the angle plate 5 is reinforced by strengthening webs 12.

A support bracket 13 is included and has a rounded left end portion 14 and a downward extension 15 at its right end, as shown in Figure 1. The bracket 13 also is equipped with a single screw receiving aperture 16 adjacent its left end extremity, and an arcuate slot 17 is provided in the right end portion including the downward extension 15. The cooperating aperture and aperture and slot sets 16, 11 and 17, 9 are adapted to receive clamp screws 18 for securing the support bracket 13 in accurately selected positions on the support wall 7, and said screws are turnable against washers 19.

The support bracket 13 also is provided with a positioning rib 20 extending therealong in the manner clearly illustrated in Figure 1 and which is receivable in the side groove 21 provided in one side wall of the sine-bar block 22 which is longitudinally adjustably secured to the support bracket 13 by screws 23 passing through elongated slots 24 in the block and threaded into receiving bores 25 provided in the bracket 13. As in the case of all of the securing clamp screws, the screws 23 turn against washers 26.

The sine-bar block 22 also is equipped with a groove 27 extending along its bottom face in which to receive the upstanding rib 28 formed on the disk rail 29 which is longitudinally adjustably secured to the block by screws 30 passing through longitudinal rail slots 31 into threaded receiving bores 32 in the block, said screws turning against washers 33. By reason of the provision of the slot and screw equipments 31, 30, the relative positioning of the disk rail 29 and the sine-bar block can be longitudinally adjusted. The disk rail 29 is equipped with a depending lug 34 adjacent each end thereof, and on each lug a cylindrical disk 35 is mounted on a cross pin 36. It is preferred that only one disk be mounted on each of the pins 36, and that the two disks be mounted at opposite sides of the rail in the manner clearly illustrated in Figures 1 and 4. It is to be understood, however, that a disk may be mounted on each end of each pin, if desired.

The sine-bar block 22 also is equipped with a T-slot 37 extending through and along its top surface, and a T-slot 38 similarly extends through and along the side wall of the block remote from the support bracket 13. A back-up jaw 39 is mounted on the top surface of the side-bar block 22 with its depending positioning rib 40 engaged in the T-slot 37, and said jaw includes a depending side skirt 41 adapted to lie against the side face of the block in the manner clearly illustrated in Figures 1 and 2 of the drawings. The jaw 39 includes a foot extension 42 through which passes a T-bolt 43 having a head portion 44 mounted in and adjustable along the T-slot 37. The skirt 41 also is secured against the side face of the block by a screw 45 passing through a bore in the skirt and threaded into a receiving bore in a head 46 mounted in and adjustable along the T-slot 38. The screw 45 turns against a washer 47. The securing devices 43, 44 and 45, 46 serve to secure the back-up jaw 39 at selected positions of adjustment along the sine-bar block 22. A supplementary securing screw 48 is provided and passes through a bore 49 in the jaw and is threaded into a receiving bore 50 in the sine bar block 22. This screw may be employed as a supplementary securing means when the jaw is to be secured in a predetermined fixed position.

A pressure jaw member 51 also is mounted on the top surface of the block 22 and has a depending rib 52 engaged in the T-slot 37. The member 51 also has a depending skirt 53 adapted to engage the side of the block in the manner clearly illustrated in Figures 1 and 3, and a foot extension 54 through which passes a T-bolt 55 having a head 56 mounted in and adjustable along the T-slot 37. The skirt 53 also is secured by two screws 57 passing through bores in the skirt and threaded into receiving bores in heads 58 mounted in and adjustable along the T-slot 38, said screws turning against washers 59. The securing devices 55, 56 and 57, 58 serve to secure the pressure jaw member 51 at selected positions of adjustment along the sine-bar block 22. A supplementary securing screw 60 also is provided and passes through a bore 61 provided in the block 22 and into a threaded bore 62 in the jaw member 51. This screw 60 may be used as a supplementary securing means when the jaw member 51 is to be secured in a predetermined, fixed position on the sine-bar block.

The jaw member 51 is bifurcated at 63 to provide parallel upstanding pillars 64 and 65, as clearly illustrated in Figure 1. A rectangular socket 66 is formed in the pillar 64 in which to receive the rectangular shank 67 of the presser plunger 68. A pressure screw 69 is threaded through a bore provided in the pillar 65 and has a square wrench receiving head 70 at one end, and a round disk enlargement 71 at its other end. The disk 71 is equipped with a center stud 72 projecting into a hardened, flat ground ring 73 directly engaging the end of the pressure plunger 67, 68.

It will be apparent by reference to Figure 1, that when the back-up jaw 39 is secured in a selected position of adjustment on the sine-bar block 22, a work piece W can be placed on the upper surface of the block 22, and by adjusting the pressure jaw member 51 into proper spaced relation to the jaw 39, and adjusting the screw 69, the pressure plunger 68 can be firmly pressed against the work piece to secure the same on the sine-bar block and against the back-up jaw 39.

The work clamping means described hereinabove is covered in my copending divisional application Serial No. 764,351, filed September 30, 1958, the work holding and indexing means herein described is covered in my copending divisional application Serial No. 764,398 filed September 30, 1958, and the specific socket wrench disclosed herein is covered in my copending divisional application Serial No. 790,415 filed February 2, 1959.

In the form of the invention shown in Figures 5 to 12, 29 and 30 the angle plate generally designated 74 has a horizontal base flange 75 and an upstanding support wall portion 76 and is reinforced by strengthening webs 77 as indicated in Figures 6, 29 and 30. The upstanding support wall portion 76 is provided with a downwardly sloping top edge portion effective to provide a high point 78 at the right hand end, as viewed in Figure 5, and a low point at the opposite end. The wall portion 76 is equipped near the high end with an arcuately arranged series of threaded, clamp screw receiving bores 79, and adjacent its other or low end said wall portion is equipped with two arcuately arranged series of threaded, clamp screw receiving bores 80. See Figure 5. As in the previously described adaptation of the invention, the base flange 75 is adapted to support Jo-blocks or gages 81 in the manner indicated in Figures 5 and 6. These selected columns of Jo-blocks are engaged by the disk 82 of the disk rail 83 which may take the same form as in the previously described adaptation, being longitudinally adjustably secured at 84 to the sine-bar block 85, and having therewith complementary rib and groove equipment generally designated 86. In this form of the invention, the sine-bar block 85 has complementary rib and groove connection at 87 with a support bracket 88 which is longitudinally adjustably secured to the block by slot and screw equipments 89. The bracket is shown as equipped at one end with a single bore 90 and an arcuate slot 91, these being adapted to cooperate with the arcuate rows of bores 80 in receiving clamp screws 92 for securing the bracket against the support wall 76 after the position of the bracket and the attached sine-bar block has been accurately determined by engagement of the disk rail with the Jo-blocks 81. The bracket also has a depending extension 93 at its other end, the right hand end as viewed in Figure 5, and this extension is equipped with an arcuate slot 94 for cooperating with the arcuate row of bores 79 in receiving clamp screws 95 for the purpose previously described. It will be apparent by reference to Figures 5 and 6 that the sine-bar block 85 also is equipped with a T-slot 96 opening through and extending along the upper face of the block and serving as a part of the work piece holder mounting devices. The work piece holder devices in this adaptation of the invention include a tail stock having a foot extension 97 and an upstanding pillar portion 98. The tail stock may be adjustably secured on the block 85 by a T-bolt 99 passing through the foot extension 97 and having its head portion mounted in and adjustable along the T-slot 94, or when the tail stock is to be secured in a single fixed position on the block this may be accomplished by employment of the screw means 100 passing up through receiving bore means provided in the block and into a threaded bore means provided in the tail stock in the manner clearly illustrated in Figures 5 and 6.

A shaft 101 having a conical point 102 is slidably mounted in a bore 103 provided in the pillar 98. The shaft has a keyway 104 in which to receive the key piece 105 which is secured to the pillar by screws 106. A split clamp block 107 surrounds the shaft 101 and is provided with a side clearance 108 toward the pillar 98 and a bottom clearance 109. See Figures 5, 11 and 12. The clamp block is secured against the adjacent face of the pillar 98 by screw means 110, dowel pin means 111 also being provided to secure the block against turning. Clamp screws means 112 is provided for securely clamping the block 107 on the shaft 101, thereby to secure the shaft in selected positions of axial adjustment in the pillar 98. A lubricant retaining bronze sponge strip 113 may be provided in the clamp block split as shown in Figure 6.

A head stock is provided for cooperating with the tail stock in holding work pieces, and said head stock includes a foot extension 114 and is bifurcated at 115 to provide upstanding, parallel pillars 116 and 117. The head stock may be adjustably secured on the sine-bar block 85 by a T-bolt 118 passing through the foot extension 114 and having its head portion engaged in and adjustable along T-slot 96 in the block. When it is desired to secure the head stock in a single fixed position, this can be accomplished by employment of the screw means 119, passing up through receiving bore means in the block and threaded into receiving bore means in the head stock in the manner clearly illustrated in Figure 5.

The head stock pillars 116 and 117 have axially aligned bores in which to rotatably support a shaft 120 having a conical point 121 thereon and an abutment flange 122. The shaft 120 also has a flattened surface 123 extending along one side thereof as indicated in Figure 5. An abutment collar 124 is screw secured at 125 on the shaft 120 and cooperates with the shaft flange 122 and disk means soon to be described in holding the shaft against endwise movement in its pillar bearings. A knurled finger knob 126 is screw secured at 127 on the shaft 120 and may be employed to impart rotation to said shaft, although it is to be understood that mechanical driving devices (not shown) may be employed for rotating said shaft.

A split clamp block 128 surrounds the shaft 120 between the pillars 116 and 117 and has opposite side clearances 129 facing toward the pillars 116 and 117, and a bottom clearance 130. The block is dowelled to the pillars as at 131, and is screw secured to said pillars at 132. The block also is equipped with a clamp screw 133 which can be manipulated to cause the block to firmly grip the shaft 120 and hold the same against rotation.

A plunger 134 is slidably mounted on the clamp block 128 at 135 and has a knurled finger knob 136 screw secured at one end thereof in the manner clearly illustrated in Figure 5. A locking pin extremity 137 is provided at the other end of the pin, flanked by a stop flange enlargement 138 in the manner clearly illustrated in Figures 5 and 10 of the drawings. A compression spring 139 surrounds the plunger pin 134 between the block 128 and the flange 138 and constantly tends to project the plunger or move the same toward the right as viewed in Figure 5 except when said plunger may be retracted against the pressure of the spring and held in its retracted position by turning the screw 140 thereagainst.

The plunger 134 is yieldably projected by the spring 139 toward an indexing disk and dog-plate assembly shown in Figures 5 and 7 and comprising the indexing disk 141 having the ring of selective, plunger receiving apertures 142, and the dog plate 143 having the radial recess 144. See Figures 8 and 9. The disks 141 and 143 are held in assembly as shown in Figures 5 and 7 by screws 145, and supplementary dowel pin means also may be provided and received in the registering apertures 146. The disks also have registering keyways 147 in which to receive the key 148 by which the assembly is secured against relative rotation on the shaft 120. The dog plate 143 may also be screw secured on said shaft at 149.

An oil groove 150 may be provided in the clamp block 128, and an oil receiving well or bore 151 may be provided in the pillar 116 and closed by a cover plate 152 having depending pins 153 removably received in bores provided in said pillar. Like the previously described clamp block, the block 128 may have a lubricant retaining bronze sponge strip mounted in the split thereof.

A bent dog 154 may be secured at 155 on the mandrel 156 carrying the work piece 157, in this case a tapered disk, and the angle bent end portion 158 of said dog may be engaged in the dog plate recess 144 so that rotation imparted to the shaft 120 will in turn be imparted to the work piece 157. It will be understood that this rotation may be continuous when the nature of the work to be performed on the work piece requires continuous rotation, or it may be a mere indexing or step movement of the work piece.

When work requiring indexing or step movement of the work piece is in progress, the finger piece 136 can be manipulated to retract the plunger 134 so as to remove the locking pin extension 137 from the selected plate aperture 142 and free the disk or plate assembly for indexing movement. After each indexing movement of the shaft, imparted by the finger piece 126, the finger piece 136 will be released to permit the spring 139 to project the locking finger into the proper, selected disk aperture for securing the indexed position of the work piece.

It should be understood that the circle of holes 142 in the indexing disk or plate 141 should be a number that is divisible by 2, 3, 4, 5, 6, 7, 8, 10 and 15, for example, 24 holes, divisible by 2, 3, 4, 6, 8, and 12, or 30 holes, divisible by 2, 3, 5, 6, 10 and 15. For this reason, selective disks each having a different number of holes should be provided, and among them should be a disk having 60 holes, but in this case the disk would be much larger than the one herein illustrated, and it would be necessary to supply sets of raising blocks of sufficient height to be interposed between the head and tail stocks and the sine-bar block so that the larger disk would have proper freedom.

It should also be understood that the indexing disk 141 should be hardened, tempered and ground flat, after which the indexing holes 142 as well as the shaft receiving holes must be lapped to perfect size and diameter.

In the adaptation of the invention shown in Figures 13 through 15 each angle plate has a base flange 159 whereon to receive the Jo-blocks or gages 160 and an upstanding support wall 161. In these instances, the walls 161 each have a high level right end portion 162 and a lower level end portion 163, there also being included stepped intermediate portions 164. An arcuate arrangement of selective, screw receiving threaded bores 165 is provided in the high level right end portion of each angle plate. The left end portion 163 shown in Figure 13 is provided with a single group of selective, screw receiving threaded bores 166 and the left end portion 163 of the angle plate shown in Figure 15 is provided with two groups of selective, screw receiving threaded bores 167.

In these adaptations, the disk rails 168 take the form previously described, and the disks 169 thereof are engageable directly on the flange 159 and on Jo-blocks 160 as shown in Figure 13, or on columns of Jo-blocks 160 only as in Figure 15. Each disk rail 168 is longitudinally adjustably secured at 170 to the downwardly presented face of a sine-bar block 171, the attachment being shown as at the lower left or at the left hand end of the block in Figure 3, and at the upper right or right hand end of said block in Figure 15. The rail and block have complementary rib and groove equipments 172 as in the previously described forms. It is also to be understood that the sine-bar block 171 will be equipped with proper work piece holding means (not shown), and that the same is longitudinally adjustably secured at 173 to a support bracket 174.

In this modified showing each support bracket has a single securing screw receiving bore 175 adjacent each end thereof for cooperation with selective bores 166 and 165 of Figure 13 or the selective bores 167 and 165 of Figure 15. Each support bracket also includes an intermediate under-slung apron, the apron of Figure 13 being designated 177, and the apron of Figure 15 being designated 178. Each of the aprons 177 or 178 is provided with securing screw or bolt receiving apertures 179 for cooperation with the arcuate slot means 180 provided in the particular intermediate upstanding support wall portion 161.

In the adaptation shown in Figures 16 through 21 the angle plate is formed of separable parts, that is, a base flange 181 whereon to receive the Jo-blocks or gages 182, and separable individually mountable and removable and adjustable upright wall portion providing units 183, 184 and 185. The unit 183 comprises a high angle or high level unit, the unit 184 comprises a low angle or low level unit, and unit 185 constitutes an intermediate unit.

The base flange 181 has a long groove 186 and a plurality of selective threaded bores 187 in which to receive unit securing screws. The unit 183 has a base 188 and a depending rib 189 receivable in the flange groove 186, and may be selectively mountable on the base flange and secured thereon by the screws 190. The unit 183 also includes the upstanding support wall portion 191 shown in Figure 16 as having a single arcuate slot 193, or a plurality of such slots may be provided at 193 as shown in Figure 17. The unit 183 may also include a lateral angle wall projection 194 to provide a gage column shelter, and the upright walls 191 and 194 may be reinforced by strengthening webs 195.

The unit 184 is provided with a base 196 having a depending rib 197 receivable in the base flange groove 186 and is adjustably and selectively secured on the base flange through the medium of the screw means 198. This unit also includes an upstanding wall portion 199 having arcuate slot means 200 therein.

The intermediate unit 185 is equipped with a base 201 having a depending rib 202 receivable in the base flange groove 186 and is adjustably and selectively secured on the base flange through the medium of the screw means 203. This unit also has an upstanding wall portion 204 equipped with arcuate slot means 205.

A disk rail similar in construction to those previously described is employed in this adaptation of the invention, and the rail has its disks 207 engageable directly on the base flange 181 and on Jo-blocks 182 as shown in Figure 16 for low angle adjustment, or on two columns of properly selected Jo-blocks 182 for high level adjustment, as shown in Figure 17, the intermediate unit 185 being dispensed with in this high angle adjustment. The previously described form of sine-bar block 209 is employed, and the disk rail 206 and said block have complementary rib and groove equipments 210. It is also to be understood that the sine-bar block is to have proper work piece holding means (not shown) mounted thereon, and the block is longitudinally adjustably secured at 211 to a support bracket 212. In this example illustration the support bracket has a single securing screw receiving bore 213 adjacent each end extremity thereof, and the sine-bar block 209 and the support bracket 212 have complementary rib and groove equipments 214. Each support bracket also has an intermediate under-slung apron, the apron of the Figure 16 arrangement being designated 215, and the apron of Figure 17 being designated 216. Each said apron is equipped with selective securing screw or bolt means receiving apertures 217 for cooperation with the arcuate slot means of the intermediate support 185 as shown in Figure 16, or with the arcuate slot means of the unit 183 as shown in Figure 17.

In the form of angle plate shown in Figures 22 through 24 there is included a base 218 and parallel spaced upright oppositely facing support wall portions 219 connected by strengthening webs 220. The spaced support wall portions are shaped to present a high angle right end portion 221 and a low angle left end portion 222. Each said wall portion is equipped with arcuate slot means 223, as shown in Figures 22 and 24.

The spacing between the parallel, oppositely facing support wall portions 219 permits insertion of a wrench such as is shown in Figures 22 and 25 and generally designated 224. This wrench has a permanent magnet end portion 225 equipped with a nut and washer receiving and retaining socket 226, and it is to be noted by reference to Figure 25 that the bottom of the socket 226 is closed at 227. In this manner, as the wrench is used to thread a nut onto a receiving bolt, the bolt end will ultimately come against the closed bottom at 227 so that upon continued threading on of the nut the same will be stripped from the magnetized holding socket. The other end portion 228 of the wrench is not magnetized, and is equipped with a nut and washer receiving socket 229 and a cross bore 230 opening into said socket. This bore permits passage of the end of a bolt onto which a nut retained in the socket 229 is being threaded.

In Figure 26, there is illustrated another slightly modified form of support bracket 231. This bracket includes a longitudinal rib extension 232 and is equipped with screw means receiving bores 233 passing through said rib. A plurality of screw receiving bores 234 is arranged in an arc adjacent each end extremity of the support bracket 231.

In all of the described forms of the invention, it is a simple matter to employ Jo-blocks resting on the base flanges in very accurately determining the position of the disk rail and the work piece supporting sine-bar block secured thereon, and then by rigidly securing the attached support bracket to the support wall portions by means of the securing screws and the complementary and selectively employed bore and longitudinal slot equipments, the supported work piece can be very accurately and securely placed and held in position without the necessity of employing C-clamps or parallel clamps. It will be readily apparent that the intermediate aprons 177, 178, 215 and 216 and the intermediate attachment thereof adds greater rigidity to the work support. All of the mountings herein described provide for completely free movement of the tools, whether the operation be drilling, milling or grinding, not only from side to side, but what is even more important, from front to back.

The side wing extensions 41 and 53 provided on the back-up and presser jaws of Figure 1 add materially to the strength and rigidity of the work piece mounting, and the particular structure of the presser jaw assures against twisting or springing of the presser jaw.

In the employment of a double walled angle plate as shown in Figures 22 to 24, it is necessary that the washers and nuts be placed from inside, or between the walls, and the wrench structure of Figures 22 and 25 greatly facilitates this operation. This requires that the inner sides or the opposed faces of the walls 219 be machined, either with a long end mill in a milling machine or with a heavy broach.

It will be readily apparent that in all installations, temporary attachment of the support brackets can be effected preparatory to the previously described accurate placement of the parts by use of the Jo-blocks, and then the final rigid attachment of the support bracket means to the supporting wall portions can be effected.

It will also be apparent that regardless of the length of the particular sine-bar block in use, only a relatively short supporting disk rail could be used, said rail being subject to adjustment along the sine-bar block to the most suitable position for cooperation with the position determining Jo-blocks.

While specific example disclosures of the apparatus are made herein, it is to be understood that the parts may be variously constructed and arranged in practicing the invention without departing from the spirit and scope of the invention as defined in the appended claims.

I claim:

1. In apparatus of the character described, an angle plate having an upright supporting wall and a base flange extending in right angular relation to the supporting wall and whereon gage blocks may be mounted, a disk rail having disks mounted on and depending from end portions thereof for supporting engagement on the base flange and/or gage blocks thereon, a sine-bar block secured on the disk rail, a support bracket secured to said block, and means for rigidly securing the bracket to the supporting wall for fixing the accurate placement of the sine-bar block determined by said disk and flange or disk and gage block engagement.

2. Apparatus as defined in claim 1 wherein the base flange and the upright supporting wall of the angle plate are separable parts, and there are included means for adjustably securing these parts together so that the supporting wall can be adjusted as to position along the base flange.

3. Apparatus as defined in claim 1 wherein the base flange and the upright supporting wall of the angle plate are separable parts, and there are included means for adjustably securing these parts together so that the supporting wall can be adjusted as to position along the base flange, said base flange and supporting wall having snugly interfitting rib and groove means accurately placing the supporting wall on the base flange in all positions of adjustment.

4. Apparatus as defined in claim 1 wherein the angle plate has a second upright supporting wall paralleling and spaced from the first mentioned supporting wall and facing in the opposite direction and with both supporting walls disposed within the width of the base flange so that a sine-bar attached support bracket can be secured to either supporting wall with the supporting disk rail overlying the base flange.

5. Apparatus as defined in claim 1 wherein are included securing devices for effecting the secure attachment of the disk rail and the sine-bar block which provide for selective adjustment of the disk rail position along the sine-bar block.

6. Apparatus as defined in claim 1 wherein are included securing devices for effecting the secure attachment of the disk rail and the sine-bar block which provide for selective adjustment of the disk rail position along the sine-bar block, and wherein also are included securing devices for effecting the secure attachment of the sine-bar block and the support bracket which provide for selective adjustment of the sine-bar block position along the support bracket.

7. Apparatus as defined in claim 1 wherein are included securing devices for effecting the secure attachment of the disk rail and the sine-bar block which provide for selective adjustment of the disk rail position along the sine-bar block, said disk rail and sine-bar block having snugly interfitting rib and groove means accurately placing the sine-bar block on the disk rail.

8. Apparatus as defined in claim 1 wherein are included securing devices for effecting the secure attachment of the disk rail and the sine-bar block which provide for selective adjustment of the disk rail position along the sine-bar block, and wherein also are included securing devices for effecting the secure attachment of the sine-bar block and the support bracket which provide for selective adjustment of the sine-bar block position along the support bracket, said sine-bar block and support bracket having snugly interfitting rib and groove means accurately placing the sine-bar block on the support bracket.

9. Apparatus as defined in claim 1 wherein the means for securing the support bracket to the angle plate permits placement of the sine-bar block at selected angular relations to the base flange determined by gage block insertion between said flange and at least one disk plate disk and includes selective and cooperating bolt receiving apertures and slots provided in opposing portions of the support bracket and the supporting wall of the angle plate.

10. Apparatus as defined in claim 1 wherein the means for securing the support bracket to the angle plate permits placement of the sine-bar block at selected angular relations to the base flange determined by gage block insertion between said flange and at least one disk plate disk and includes at least one bolt receiving aperture in each end of the support bracket and a cooperating elongated slot in an opposing portion of the supporting wall of the angle plate.

11. Apparatus as defined in claim 1 wherein the means for securing the support bracket to the angle plate permits placement of the sine-bar block at selected angular relations to the base flange determined by gage block insertion between said flange and at least one disk plate disk and includes an arcuate slot in each end of the support bracket and a cooperating series of selective apertures in an opposing portion of the supporting wall of the angle plate.

12. Apparatus as defined in claim 1 wherein the means for securing the support bracket to the angle plate permits placement of the sine-bar block at selected angular relations to the base flange determined by gage block insertion between said flange and at least one disk plate disk and includes selective and cooperating bolt receiving apertures and slots provided in opposing portions of the support bracket and the supporting wall of the angle plate, said support bracket also including an apron extending therefrom intermediately of the ends thereof and parallel the opposing supporting wall of the angle plate, and there being included also selective and cooperating bolt receiving apertures and slots in opposing portions of said opposing apron and supporting wall portions.

13. Apparatus as defined in claim 1 wherein the supporting wall includes a high angle support portion toward one end of the base flange and a low angle support portion toward the opposite end of the base flange and at least one clearance between said high angle and low angle support portions.

14. Apparatus as defined in claim 1 wherein the supporting wall includes separate and distinct high angle and low angle support portions independently secured on the base flange so that the spacing thereof can be varied, and each said supporting wall portion and an end of the support bracket having complementary slot and aperture means through which the respective ends of the support bracket can be secured at various heights depending upon the angle intended for the sine-bar block placement.

15. Apparatus as defined in claim 1 wherein the supporting wall includes separate and distinct high angle and low angle support portions independently secured on the base flange so that the spacing thereof can be varied, and each said supporting wall portion and an end of the support bracket having complementary slot and aperture means through which the respective ends of the support bracket can be secured at various heights depending upon the angle intended for the sine-bar block placement, and wherein there are also included an intermediate support wall portion removably mounted on the base flange, an apron depending from the support bracket intermediately of the ends thereof, and means for securing said apron to the intermediate support wall portion.

References Cited in the file of this patent

UNITED STATES PATENTS

| | | |
|---|---|---|
| 414,174 | Trask | Oct. 29, 1889 |
| 1,887,216 | Reynolds | Nov. 8, 1932 |
| 2,345,708 | Lines | Apr. 4, 1944 |
| 2,347,111 | Jesionowski | Apr. 18, 1944 |
| 2,366,385 | Comfort | Jan. 2, 1945 |
| 2,567,517 | Keebler | Sept. 11, 1951 |
| 2,625,861 | Swanson | Jan. 20, 1953 |
| 2,635,346 | Muench | Apr. 21, 1953 |
| 2,649,785 | Sirko | Aug. 25, 1953 |
| 2,671,369 | Clark | Mar. 9, 1954 |